May 7, 1968  G. H. TAUSCH  3,381,532
PROTECTIVE VALVE FOR DIFFERENTIAL PRESSURE METERS
Filed April 4, 1966  2 Sheets-Sheet 1

Gilbert H. Tausch
INVENTOR.

BY
ATTORNEYS

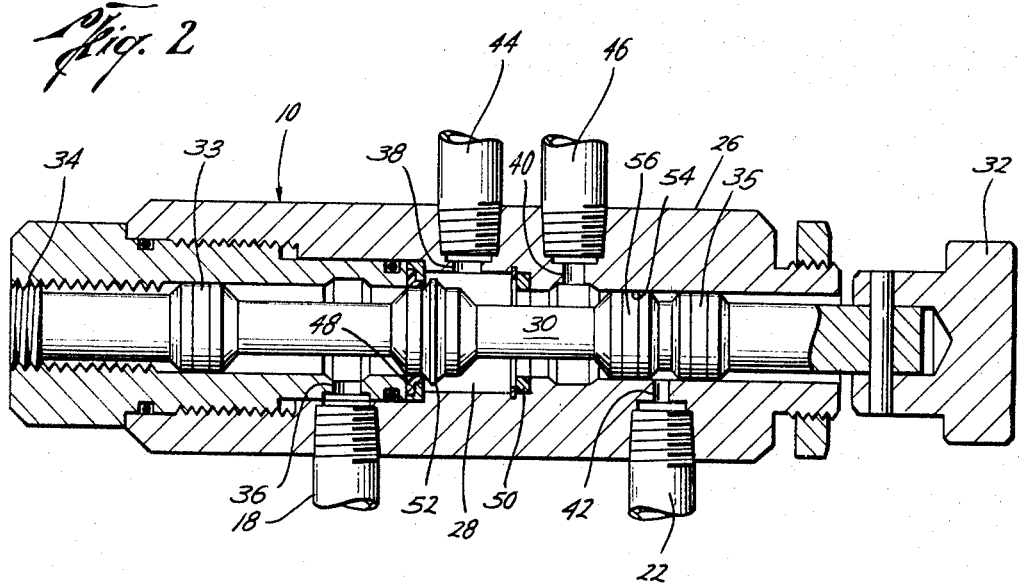
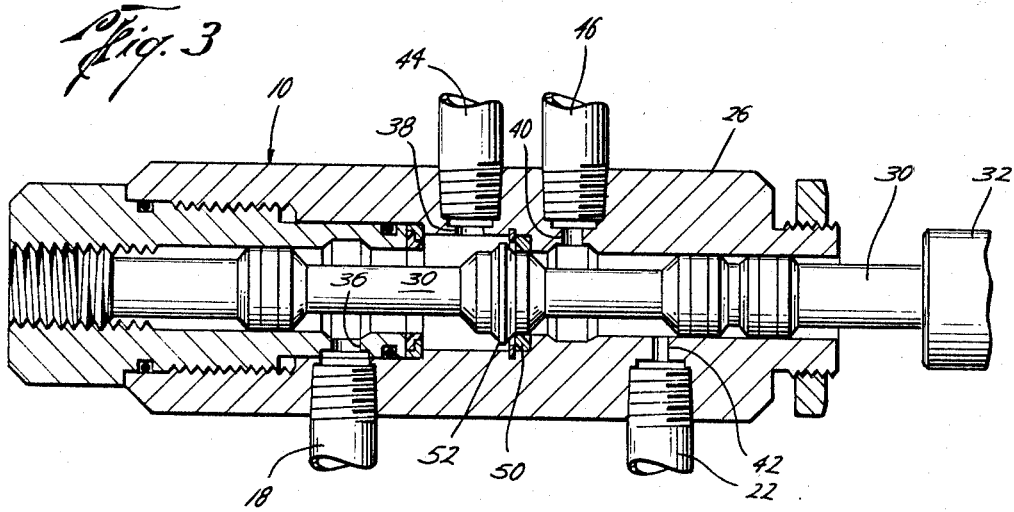

3,381,532
PROTECTIVE VALVE FOR DIFFERENTIAL
PRESSURE METERS
Gilbert H. Tausch, Houston, Tex., assignor to Camco Incorporated, Houston, Tex., a corporation of Texas
Filed Apr. 4, 1966, Ser. No. 539,935
3 Claims. (Cl. 73—211)

ABSTRACT OF THE DISCLOSURE

A three-way valve for use in combination with a differential pressure measuring instrument which eliminates the problems of human errors in sequencing valve operations by insuring that the pressure across the measuring instrument will be equalized both in placing it into service and taking it out of service without the possibility of a pressure being applied to only one side of the measuring instrument. A valve for use in combination with a differential pressure measuring instrument for placing the instrument in service or taking it out of service and in which the valve has first and fourth ports connected to the source of differential pressure to be measured, and second and third ports connected to the measuring instrument, and includes valve means connected to a single actuating stem which in one position allows communication between a second and third port and closing of the first and fourth ports, and while in a second position allows communication between the first and second ports and also allows communication between the third and fourth ports, and which provides an intermediate position in which pressure across the instrument is balanced.

---

Figure 1:
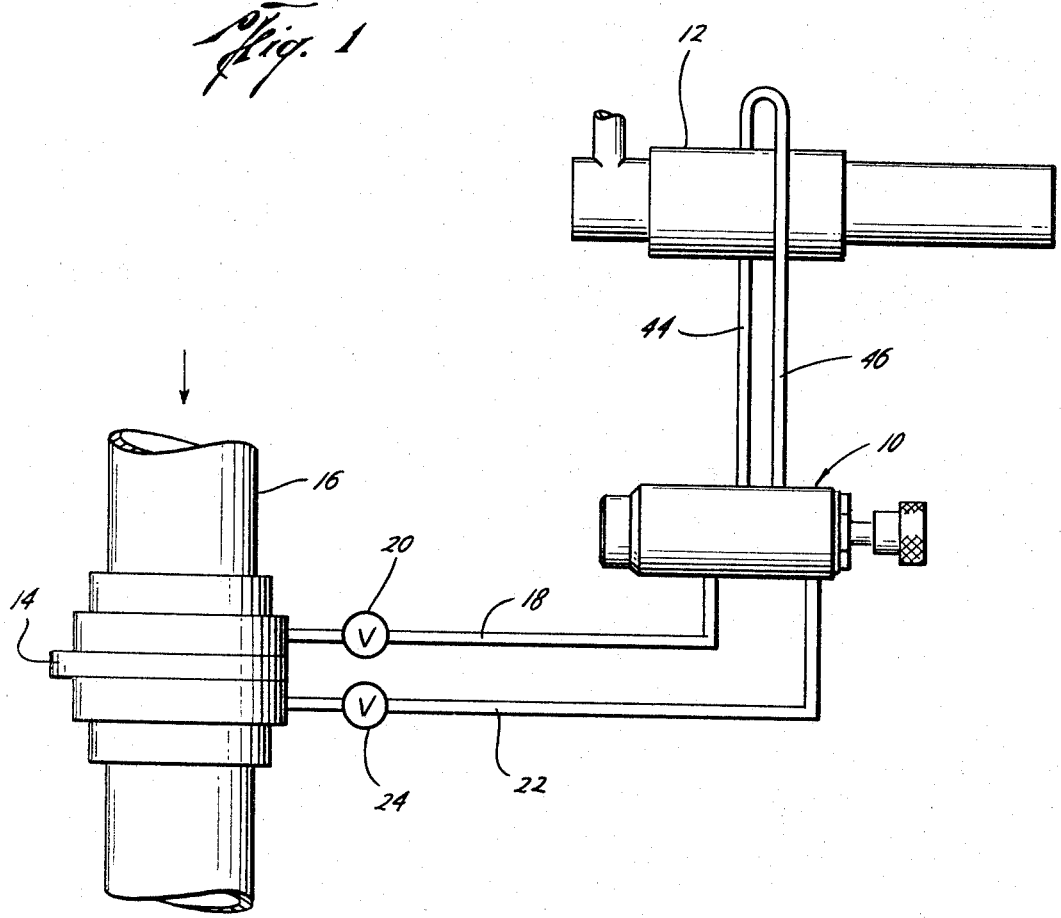

The present invention relates to a valve, and more particularly to a three-way valve one use of which is for placing sensitive measuring instruments in service or taken out of service without damage.

By way of example only, the valve of the present invention will be described in connection with its use of placing in and taking out of service differential pressure measuring instruments, but it is understood that this is by way of illustration only and the present valve may be used in connection with the performance of other operations.

Generally, a differential measuring instrument such as a diaphragm type or a mercury type may be used to measure differential pressure from a differential pressure source such as a differential pressure across an orifice plate for the purpose of measuring gas flow such as described in Patent No. 3,097,527. While the pressure of the differential source may be extremely large, either the upstream or downstream pressure, for example 1000 p.s.i., the differential range measured by the pressure transducer may be comparatively small, for example 100 inches of water. Therefore, if only one side of the differential pressure source is applied at any time to the differential pressure measuring instrument, the sensitive instrument would quite likely be damaged.

Therefore it is a general object of the present invention to provide a valve having a single handle that permits a series of ports to be opened and closed in a particular sequence.

A still further object of the present invention is the provision of a three-way valve having a single operating stem that permits a series of ports to be opened or closed in a proper sequence such as for placing instruments in or out of service.

Yet a still further object of the present invention is the provision of a three-way valve for use in combination with a differential pressure measuring instrument which measures the pressure drop of a source of differential pressure by providing a valve which automatically equalizes with a single valve handle, and seals in the correct order to eliminate the problems of human error in sequencing valve operation by insuring that the pressure across the measuring instruments will be equalized both in placing into service and taking it out of service without the possibility of either upstream or downstream pressure being applied to only one side of the measuring instrument.

Yet a further object of the present invention is the provision of an improved valve for use in combination with a differential pressure measuring instrument for placing the instrument in service or taking it out of service, and in which the valve has first and fourth ports connected to the source of differential pressure to be measured, and second and third ports connected to the measuring instrument, and includes valve means connected to a single actuating stem which in one position allows communication between a second and third port and closing of the first and fourth ports and while in a second position allows communication between the first and second ports and also allows communication between the third and fourth ports, and which provides an intermediate position in which pressure across the instrument is balanced.

Still a further object of the present invention is the provision of a three-way valve having first, second, third and fourth ports longitudinally spaced along the body, and a first valve seat in the chamber between the first and second ports, a second valve seat in the chamber between the second and third ports, a third valve seat in the chamber between the third and fourth ports, and valve means connected to and actuated by a single actuating stem in which when the valve means are positioned at one extreme position the first and third valve seats are closed thereby providing communication between the second and third ports, and when the stem is in the opposite extreme position the second valve seat is closed but the first and second valve seats are opened thereby providing communication between the first and second ports and communication between the third and fourth ports.

Yet a further object is the provision of a three-way valve for use in combination with a differential pressure measuring instrument which measures the pressure drop across an orifice plate so that the instrument may be connected and disconnected from a differential pressure source in proper sequence to avoid damaging the instrument in which a valve is provided having first, second, third and fourth ports longitudinally spaced along the body, and communicating at longitudinally spaced points in the valve chamber in which the first port is connected to the upstream side of the orifice plate, the second port is connected to the high pressure side of the instrument, the third port is connected to the low pressure side of the instrument, and the fourth port is connected downstream of the orifice plate in which a first valve seat is provided between the first and second ports, a second valve seat is provided between the second and third ports and in which a third valve seat is provided between the third and fourth ports, the third valve seat being an elongate tubular member and in which valve elements are connected to a single actuating stem for seating on the valve seats with the valve element coacting with the third valve seat being an annular valve which is slidably engageable with the third valve seat thereby allowing the first and third seats to be securely sealed at the same time and handle high pressures.

Other and further objects, features and advantages will be apparent from the following description of a presently preferred embodiment of the apparatus of the invention, taken in conjunction with the accompanying drawings, where like character references designate like parts throughout the several views, and where:

FIGURE 1 is an elevational drawing illustrating the use of the present valve in conjunction with a measuring instrument for measuring differential pressure across an orifice plate, FIGURE 2 is an elevational view, in cross-section, illustrating the valve of the present invention in one position, and FIGURE 3 is an elevational view, in cross-section illustrating the valve of FIGURE 2 in its extreme opposite position.

Referring now to the drawings, and particularly to FIGURE 1, the valve 10 is shown, by way of example only, in use in a portion of a conventional flow measurement system in which a pressure differential instrument 12 is used to measure the differential pressure across an orifice plate 14 in a gas pipeline 16 to provide one of the factors for determining the quantity of gas flow through the line 16. Thus, a pressure line 18 is connected to the upstream side of the orifice plate 14 through a cutoff valve 20 and line 22 is connected to the downstream side of the orifice plate 14 through a cutoff valve 24. Thus, one of the factors determining the quantity of gas flow through the line 16, the differential pressure, is measured across the lines 18 and 22 by the differential pressure measuring instrument 12. Such a measurement system is conventional and a complete system is shown in Patent No. 3,097,527.

However, the pressure in the pipeline 16 is much larger than the differential pressure being measured. By way of example only, the pressure in the pipeline may be 1,000 pounds per square inch while the differential pressure being measured may be less than 100 inches of water. Therefore, it is necessary when the pressure measuring instrument 12 is put into service or taken out of service that the differential pressure applied to the measuring instrument 12 does not become overbalanced to the extent that the instrument 12 will be damaged. For example, if one of the lines 18 and 22 were shut off separately from the other line, a differential pressure equal to line pressure, for instance 1,000 pounds per square inch, could be applied across the measuring instrument 12 in which case the measuring element, for instance mercury or a bellows in the instrument 12, would be damaged.

The present invention is directed to the provision of a valve 10 having a single operating handle that permits the equalizing and seating operations in a desired sequence for placing the measuring instrument 12 in or out of service thereby eliminating the problems of human error in sequencing valve operation.

Referring now to FIGURES 2 and 3, the valve 10 in the present invention generally includes a body 26 having a chamber 28 through which a longitudinal stem 30 is positioned and which extends out of the body 26 to an operating knob 32. The stem 30 is mounted for longitudinal movement in the body 26 such as by threads 34 whereby on rotation of the knob 32 and thus the stem 30, the stem 30 may be moved longitudinally in one direction by clockwise rotation and may be moved longitudinally in the opposite direction by counterclockwise rotation. The chamber 28 is suitably sealed by providing seals 33 and 35 adjacent opposite ends of the chamber 28 between the stem 30 and the body 26.

First port 36, second port 38, third port 40, and fourth port 42 are provided longitudinally spaced along the body 26 at longitudinally spaced points communicating with the chamber 28. Ports 36 and 42 are connected to the source of differential pressure with the port 36 preferably being connected to the upstream line 18, and the port 42 being connected to the downstream line 22. Ports 38 and 40 are connected to the measuring instrument 12 with the port 38 preferably connected to the high pressure side of the instrument 12 through line 44, and the port 40 being connected to the low pressure side of the instrument 12 through a line 46. A first valve seat, such as a shoulder type valve seat 48 is provided between the first port 36 and the second port 38. A second valve seat, such as shoulder valve seat 50, is provided between the second port 38 and the third port 40. A first valve element, such as spool type valve 52 is provided connected to the stem 30 between the first and second valve seats 48 and 50 and which when seated on valve seat 48, as shown in FIGURE 2, allows fluid communication between port 38 and port 40 to balance the pressure on the instrument 12. A third valve seat 54 is provided between ports 40 and 42 which coacts with a second valve 56 also connected to the stem 30. While the valve seat 54 and valve element 56 could also be a shoulder type and in a closed position in FIGURE 2, it is advantageous that the seat 54 be an annular tubular member and the valve element 56 be an annular O-ring which slidably and seatably engages the seat 54 as otherwise it would be difficult to manufacture two halves such as 52 and 56 having shoulder seats which would both completely seal at the same time so as to be capable of handling pressures in the magnitude of 10,000 pounds per square inch. It is thus noted that in the position shown in FIGURE 2 the valve element 52 is seated on seat 48 and the valve element 56 is seated on seat 54 whereby the ports 36 and 42 are blocked from communication with the instrument 12 and the ports 38 and 40 leading to the instrument 12 are in communication thereby balancing the pressure on opposite sides of the differential pressure measuring instrument 12.

Still referring to FIGURE 2, as the knob 32 is rotated and the stem 30 is longitudinally moved, the valve 52 will move off of the seat 48 thereby allowing line pressure to flow in the port 36. Since the valve seat 50 is open at this position, the incoming line pressure will flow to both instrument ports 38 and 40 thereby balancing the pressure on opposite sides of the differential pressure measuring instrument 12 to automatically prevent any damaging unbalance of pressure on the instrument 12. As the knob 32 is continued to be actuated and the stem 30 longitudinally moved, valve 56 will move past the port 42 thereby admitting the other side of the line pressure through port 42 which again will flow to both of the instrument ports 38 and 40 and will not unbalance the pressures across the instrument 12. It is to be noted that the port 42 is sized small enough relative to the O-ring valve 56 in order that the O-ring valve 56 can slide over the port 42 without being caught or sheared.

As the knob 32 is continued to be rotated and the stem 30 longitudinally moved as best seen in FIGURE 3, the valve 52 will seal against the seat 50 at which time the high pressure instrument port 38 will be in communication with only the upstream line port 36 and the low pressure instrument port 40 will be in communication with only the downstream line port 42 and therefore the only unbalance to which the instrument 12 is subjected is the normal unbalance which it is measuring in the differential pressures and the pipeline 16. Thus, a single operating knob is provided which permits the series of ports to be opened in proper sequence for placing the measuring instrument 12 in service.

The valve 10 will also similarly protect the measuring instrument 12 when it is being taken out of service by rotating the knob 32 in an opposite direction and longitudinally moving the stem and its connected valve in the opposite direction. Thus, valve 52 is first moved off of the seat 50 from its position as shown in FIGURE 3 with the result that both the high and low line pressures entering ports 36 and 42 are in communication with the instrument ports 38 and 40 thereby balancing the pressures on the instrument 12 somewhere between the upstream and downstream line pressures. As the knob 32 is continued to be actuated, valve 56 crosses port 42 and seats on the seat 54 thereby blocking the low pressure line port 42 from communication with the other ports and thereby applying the upstream line pressure through port 36 to both sides of the instrument 12 through ports 38 and 40 thereby continuing to balance the pressure on the measuring instrument 12. Finally, at its extreme position, as seen in FIGURE 2, the valve 52 is seated on valve seat 48 and both of the line pressure ports 36 and 42 are blocked from communication and the two instrument ports 38 and 40 are in communication with each other to prevent any undesired unbalance of pressure across the measuring instrument 12. Therefore, the present valve 10 will perform the equalizing or balancing operations across the instrument 12 in a correct order in both placing the instrument in or taking the instrument out of service by the operation of a single operating knob thereby eliminating the problems of human error in sequencing multiple valve operation.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts can be made which will readily suggest themselves to those skilled in the art and which are encompassed within the spirit of the invention and the scope of the appended claims.

What is claimed is:

1. In combination with a differential pressure measuring instrument which measures a source of differential pressure, the improvement in a valve for connecting and disconnecting the instrument with said source comprising,
   a valve body having a chamber,
   a valve stem movably connected to the body and positioned interiorly of said chamber and extending outside of said body,
   seal means adjacent opposite ends of said stem sealing between said stem and the body,
   first, second, third and fourth ports spaced along the body and communicating at longitudinally spaced points of the chamber between the seal means,
   said second and third ports being connected to the instrument,
   said first and fourth ports connected to the source of differential pressure to be measured,
   valve means connected to the stem in one position providing communication between the second and third ports and closing said first and fourth ports, and in a second position allowing communication between the first and second ports and allowing communication between the third and fourth ports.

2. In combination with a differential pressure measuring instrument which measures a source of differential pressure, the improvement in a valve for connecting and disconnecting the instrument with said source comprising,
   a valve body having a body chamber,
   an elongate valve stem threadedly connected to the body for logitudinal movement and mounted in said chamber and extending outside said body,
   first, second, third and fourth ports laterally spaced along said body and communicating at longitudinally spaced points to the chamber,
   said second and third ports connected to the instrument,
   said first and fourth ports connected to the source of differential pressure to be measured,
   a first valve seat in said chamber between the first and second ports,
   a second valve seat in said chamber between the second and third ports,
   first valve means connected to the stem and positioned between the first and second valve seats, said first valve means adapted to alternately seat on said first and second seats by longitudinal movement of said stem,
   a third valve seat in said chamber between said third and fourth ports, said third seat being elongate,
   a second valve connected to the stem and slidably engageable with the third valve seat, said second valve spaced relative to the first valve means a distance to allow communication between the third and fourth ports before the first valve means is seated on the second valve seat.

3. In combination with a differential pressure measuring instrument which measures the differential pressure across an orifice plate, the improvement in a valve for connecting and disconnecting the instrument with said differential pressure comprising,
   a valve body having a body chamber,
   an elongate valve stem threadedly connected to the body and mounted in said chamber for longitudinal movement therein and extending outside said body,
   seal means adjacent opposite ends of said stem sealing between the stem and the body,
   first, second, third and fourth ports longitudinally spaced along said body and communicating at longitudinally spaced points to the chamber, said first port connected on the upstream side of the orifice plate, the second port connected to the high pressure side of the instrument, the third port connected to the low pressure side of the instrument, and the fourth port connected to the downstream side of the orifice plate,
   a first valve seat in said chamber between the first and second ports,
   a second valve seat in said chamber between the second and third ports,
   first valve means connected to the stem and positioned between the first and second valve seats, said first valve means adapted to be alternately seated on said first and second seats by alternate longitudinal movement of said stem,
   a third valve seat in said chamber between said third and fourth ports, said third seat being an elongate tubular member,
   second valve means connected to the stem and slidably engageable with the third valve seat, said second valve spaced relative to the first valve means a distance to allow communication between the third and fourth ports, said third seat being elongate, and fourth ports before the first valve means is seated on the second valve seat.

References Cited
UNITED STATES PATENTS

| | | | |
|---|---|---|---|
| 3,087,334 | 4/1963 | Brown | 73—198 |
| 306,880 | 10/1884 | Wallace | 137—599.1 |
| 2,247,141 | 6/1941 | Twyman | 137—599.1 |
| 2,855,042 | 10/1958 | Kryzer | 137—599.1 |

JAMES J. GILL, *Primary Examiner.*

R. S. SALZMAN, *Assistant Examiner.*